United States Patent [19]
Klink

[11] 3,789,492
[45] Feb. 5, 1974

[54] LOCK FOR MOTOR VEHICLE SAFETY BELT

[76] Inventor: Wolf-Dieter Klink, Danziger Weg 520, Lindach, Germany

[22] Filed: Feb. 16, 1972

[21] Appl. No.: 226,714

[30] Foreign Application Priority Data
Feb. 17, 1971 Germany.................. P 21 07 666.4

[52] U.S. Cl. .......................................... 24/230 AL
[51] Int. Cl. .......................................... A44b 11/26
[58] Field of Search.................. 24/230 AL, 230 AN

[56] References Cited
UNITED STATES PATENTS
2,903,774  9/1959  Harley............................. 24/230 AL
3,450,434  6/1969  Schock............................ 24/230 AL
FOREIGN PATENTS OR APPLICATIONS
1,187,526  4/1970  Great Britain.................. 24/230 AL

*Primary Examiner*—Bernard A. Gelak
*Attorney, Agent, or Firm*—Arthur E. Wilfond et al.

[57] ABSTRACT

Lock for motor vehicle safety belt having a coupling member connected thereto, the coupling member being provided with a tongue-shaped insert portion insertable in direction of tension of the belt into the lock and formed with a through-opening therein, includes a lock member having a base plate, a pair of extension arms therefrom bent into the shape of a U and formed with recesses therein, and a support plate held in the recesses and extending spaced from and parallel to the base plate; and a stop bolt mounted in the lock member and being axially displaceable against a spring-biasing force transversely to the insertion direction of the tongue-shaped insert portion so as to engage in the through-opening formed therein, the support plate having guide means for guiding the stop bolt transversely to the insertion direction.

3 Claims, 6 Drawing Figures

Patented Feb. 5, 1974

Patented Feb. 5, 1974 3,789,492

LOCK FOR MOTOR VEHICLE SAFETY BELT

The invention relates to a lock for motor vehicle safety belts and more particularly for such belts wherein a coupling member is connected to a shoulder and/or a pelvic belt and is provided with a tongue-shaped insert portion insertable in direction of tension of the belt into the lock and formed with a through-opening therein into which a stop bolt mounted in the lock is axially displaceable against a spring-biasing force transversely to the insertion direction of the tongue-shaped insert portion of the coupling member.

The heretofore known embodiments of locks of this type require either a relatively high cost of manufacture and materials or they do not withstand the mechanical stresses occurring in the event of danger because of their construction and consequently do not meet the specifications established in various states and countries.

It is accordingly an object of the invention to provide a lock for safety belts of the aforedescribed type which withstands the stresses established in the safety provisions in spite of reduced cost for material and manufacture.

With the foregoing and other objects in view, there is provided in accordance with the invention, lock for a motor vehicle safety belt having a coupling member connected thereto, the coupling member being provided with a tongue-shaped insert portion inserted in direction of tension of the belt into the lock and formed with a through-opening therein, the lock comprising a lock member including a base plate, a pair of extension arms therefrom bent into the shape of a U and formed with recesses therein; and a support plate held in the recesses and extending spaced from an parallel to the base plate; and a stop bolt mounted in the lock member and being axially displaceable against a spring-biasing force transversely to the insertion direction of the tongue-shaped insert portion of the coupling member so as to engage in the through-opening formed therein, the support plate having guide means for guiding the stop bolt transversely to the insertion direction. Preferably the support plate is form-lockingly held in the recesses formed in the tension arms from the base plate.

An especially small and mechanically stable structure of a lock is provided when, in accordance with another feature of the invention, the ends of the extension arms, which project beyond the support plate, are connected by a cross-piece having additional guide means for the stop bolt and preferably form-lockingly held. The spring which retains the stop bolt in locking position thereof is wound on the stop bolt between the support plate and the cross-piece against which it abuts, the counter-bearing for the spring being formed of a pin extending transversely through the stop bolt and simultaneously provides an engagement location for an actuating member to raise the stop bolt out of the locking position thereof.

In accordance with a further feature of the invention, the cross-piece has an extension which covers an intermediate space wherein the spring and the actuating member are received toward the side of the lock which has the insert opening therein for the coupling member.

In accordance with an additional feature of the invention, an extension is stamped out of the base plate or the support plate and serves for limiting the insertion depth of the coupling member into the lock and forms a counter-bearing for an elastic ejection member.

Other features which are considered as characteristic for the invention are set forth in the appended claims.

Although the invention is illustrated and described herein as lock for motor vehicle safety belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
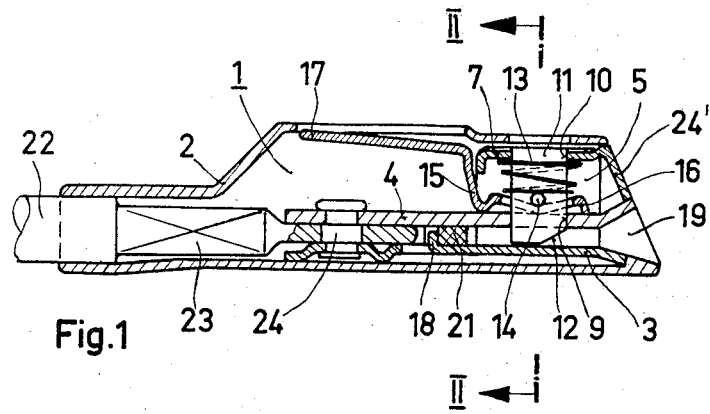
FIG. 1 is a longitudinal sectional view of the lock for motor vehicle safety belt constructed in accordance with the invention.
Figure 4:
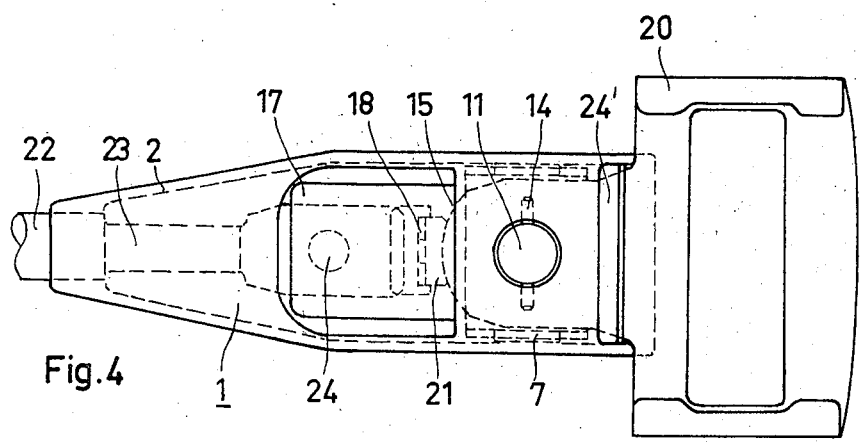
FIG. 4 is a top plan view of the lock of FIG. 1 with a connecting member locked therein.
Figure 2:
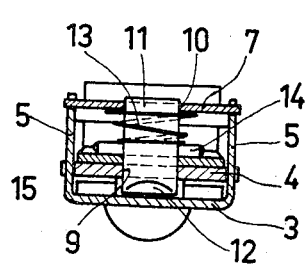
FIG. 2 is a cross-sectional view of FIG. 1 taken along the line II — II in the direction of the arrows, with the housing of the lock omitted.
Figure 3:
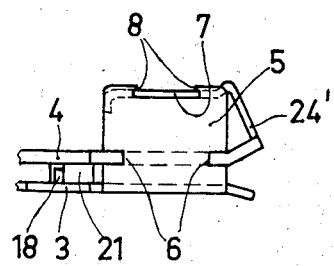
FIG. 3 is a fragmentary elevational view of FIG. 1 with the lock housing omitted.
Figure 6:
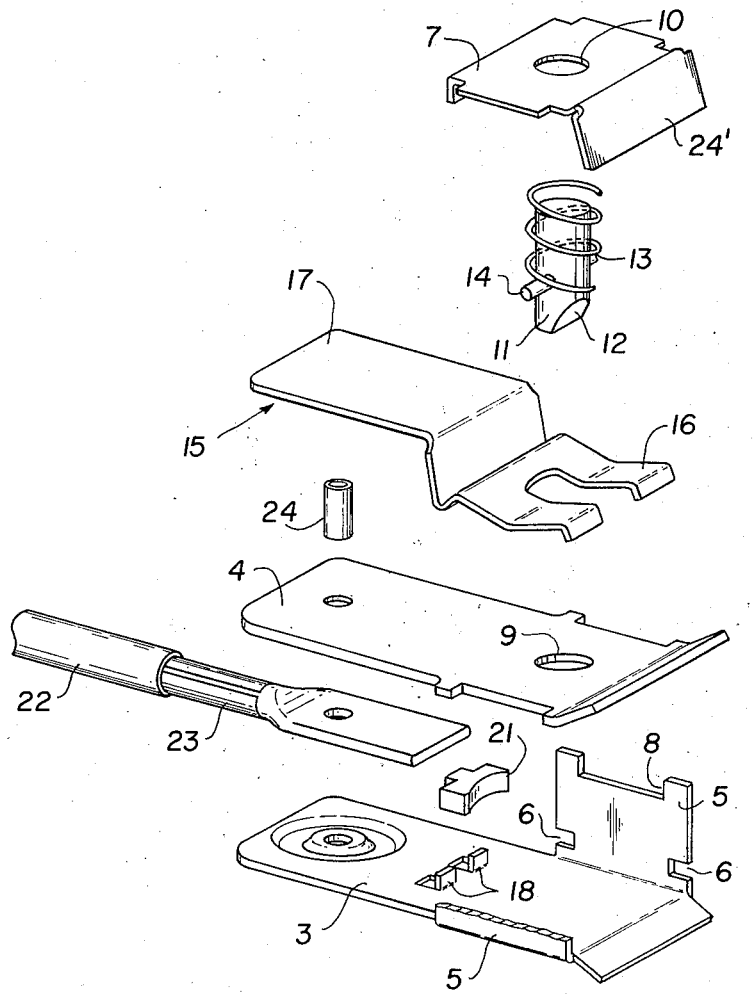
FIG. 6 is an exploded view of the lock.
Figure 5:
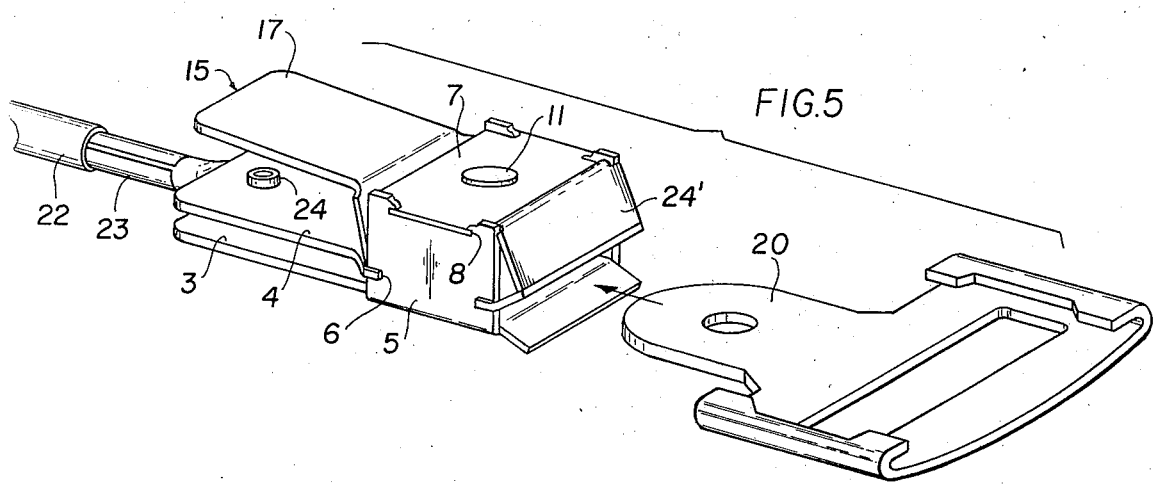
FIG. 5 is a perspective view of the lock showing the connecting member and separated therefrom.

Referring now to the figures of the drawing, there is shown therein a lock 1 constructed in accordance with the invention and having a housing 2 in which a lock member assembled of a base plate 3 and a support plate 4 is disposed. The base plate 3 has extending therefrom U-shaped bent extension arms 5 formed with lateral recesses 6 in which the support plate 4 engages so that it is fixed form-lockingly parallel to and spaced from the base plate 3. Ends of the extension arms 5 project beyond the support plate 4 and are connected to one another by a transverse cross-piece 7 which engages in recesses 8 formed in edge regions of the extension arms 5 and, for example, by mortising the edges of the recess, is form-lockingly fixed therein. The embodiment of the lock member shown in the figures is exceptionally stable mechanisally, notwithstanding the economy of materials and relatively simple manufacturing techniques employed in the construction thereof.

A guide 9 is provided in the support plate and a further guide 10 in the cross-piece 7 for guiding a stop bolt 11 having an end formed with a run-up incline 12 which projects into the space between the base plate 3 and the support plate 4. A spring 13 is wound around the stop belt 11 and abuts the inner side of the transverse cross-piece 7, on the one hand, and a transverse pin 14 extending through the stop bolt 11, on the other hand, and thereby the stop bolt 11 is held in locking position thereof. On the side opposite the spring 13, an actuating member 15 having a lever arm 16 engages therewith the transverse pin 14, while another lever arm 17 thereof is formed as a press key, by the actuation of which the stop bolt 11 is displaceable out of the locking position thereof against the biasing action of the spring 13. An extension 18 is stamped free from the base plate 3 and is bent toward the support plate 4 so as to form a stop or abutment for a connecting member 20 inserted through the insert opening 19 into the lock, or serves as counterbearing for an elastic member 21, formed for example of a rubber layer or a spring, which ejects the connecting member 20 out of the lock when the lock bolt 11 is unlocked. Between the base plate 3 and the support plate 4, a connecting element 23 connected to a flexible steel cable 22 or the like projects from a side of the lock opposite to the side thereof in which the insert opening 19 is located, the connecting element 23 being fixed in the lock by a transverse pin 24. The space between the base plate 4 and the transverse cross-piece 7 wherein the spring 13 is received is closed by an extension 24' of the transverse cross-piece 7 toward the direction of insertion of the connecting member 4.

I claim:

1. A lock for use with a motor vehicle safety belt wherein a coupling member having a through-opening therein is received in the lock, comprising a base plate, a pair of spaced extension arms projecting from said base plate and disposed to form a U with said base plate, said extension arms having recesses therein, a support plate disposed in spaced and parallel disposition relative to said base plate, said support plate being mounted in said recesses of said extension arms, said extension arms having projecting portions thereof projecting beyond said recesses, a separate cross-piece disposed in spaced and parallel disposition relative to said support plate, said cross-piece being mounted on said projecting portions of said extension arms, axially aligned guide opening means in said support plate and said cross-piece, a stop bolt mounted in the guide opening means in said support plate and cross-piece, and spring means on said stop bolt disposed in the space between said support plate and said cross-piece and biased against said cross-piece for urging said stop bolt into the space between said support plate and said base so as to engage the through-opening of the connecting member received in said space between said support plate and said base.

2. Lock according to claim 1 including an extension stamped out of said base plate and bent toward said support plate, said stamped-out extension serving to limit the insertion depth of the coupling member.

3. Lock according to claim 2 including an elastic ejection member, said stamped-out extension serving as counter-bearing for said ejection member.

* * * * *